Patented Mar. 1, 1932

1,847,329

UNITED STATES PATENT OFFICE

JOYCE H. CROWELL, OF BUFFALO, NEW YORK, ASSIGNOR TO NATIONAL ANILINE & CHEMICAL CO., INC., OF NEW YORK, N. Y., A CORPORATION OF NEW YORK

METHOD OF PRODUCING CHLORINATED DERIVATIVES OF INDANTHRENE AND THE PRODUCTS

No Drawing. Application filed June 16, 1924. Serial No. 720,287.

This invention relates to improvements in the manufacture and production of chlorine derivatives or substitution-products of N-dihydro-1.2.2'.1'-anthraquinonazine.

I have found that by treating N-dihydro-1.2.2'.1'-anthraquinonazine, which is also known as indanthrene

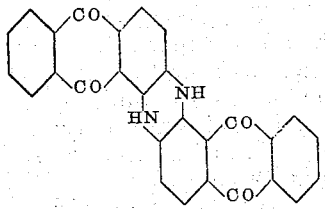

with chlorine in the presence of nitrobenzene at ordinary temperatures, or at temperatures not exceeding about 70° C., chlorinated derivatives of indanthrene can be produced which contain from about 15 to about 31 or 32 percent of chlorine. The products thus produced contain, according to analysis, the equivalent of from somewhat more than two to about six atoms of chlorine in their composition.

I have further found that these chlorinated compounds upon treatment with appropriate reducing agents, for instance, such as an alkaline sodium hydrosulfite solution and subsequent oxidation by air, can be converted into a dichlor-derivative of indanthrene, that is, a dichlor-N-dihydro-1.2.2'.1'-anthraquinonazine which contains about 10 to 14 percent chlorine and which is substantially identical or equivalent to known commercial products.

The following examples will further illustrate the invention, but it is understood that the invention is not limited thereto. The parts are by weight.

*Example 1.*—A current of chlorine is introduced into a well-stirred mixture or suspension of 80 parts of indanthrene and 1920 parts nitrobenzene at ordinary temperature, e. g., about 15°-20° C. In a short time, due to the exothermic reaction, the temperature of the mixture spontaneously rises to about 50°-60° C., and the indanthrene appears to go into solution. At this point the absorption of the chlorine is rapid and the apparent solution soon becomes viscous and then gradually less viscous as chlorination proceeds, and the color of the solution gradually changes from a blue to a red-brown. At the same time a product gradually separates out which at first is of a blue to a greenish-blue color but which after a while, and as the chlorination proceeds, finally changes to a yellow color. During the chlorination, the solution is kept saturated with chlorine by introducing it as rapidly as it is absorbed. An excess of chlorine may be employed. When little or no more chlorine is absorbed, and the precipitated product is of a yellow color, the chlorination is complete, and the product is filtered off and washed with benzene or alcohol and finally with hot water. The nitrobenzene in the filtrate can be subsequently recovered in any suitable manner or according to a process hereinafter described.

The yellow to greenish-yellow product thus obtained corresponds by analysis to a hexachlor-1.2.2'.1'-anthraquinonazine containing about 31 to 32 percent chlorine. It is soluble in concentrated sulfuric acid giving a brownish-red solution which upon dilution with water produces a yellow to greenish-yellow precipitate. The product can be used directly for dyeing from an alkaline hydrosulfite vat. Upon treatment with an alkaline hydrosulfite solution and subsequent oxidation with air, it loses chlorine and is converted into a product which according to analysis represents a dichlor-N-dihydro-1.2.2'.1'-anthraquinonazine containing about 10 to 14 percent chlorine and which gives dyeings of excellent fastness toward sodium or calcium hypochlorite solution.

*Example 2.*—50 parts indanthrene are suspended in 600 parts nitrobenzene and chlorine is passed into the mixture as described in Example 1. Chlorine is passed into the mixture for about one to two hours or until a bluish-green precipitate is formed which is filtered off and washed with benzene or alcohol and finally with hot water. It is found by analysis to correspond to about a tetrachlor-derivative or substitution-product of indanthrene. Upon further chlorination it produces a product identical to that finally obtained in Example 1. The bluish-green product thus obtained can be used directly as a dyestuff from an alkaline hydrosulfite vat, and, as in Example 1, the product is converted by this treatment into a dichlor-indanthrene containing about 10 to 14 percent chlorine. The product is soluble in concentrated sulfuric acid to give an olive-brown solution which, upon dilution with water, gives a yellowish-green to bluish-green precipitate.

*Example 3.*—Chlorine is passed into 600 parts nitrobenzene until about 31 parts of chlorine have been absorbed and dissolved. To this well-stirred solution, cooled to about 5° C., is added 40 parts of finely divided indanthrene. The temperature is not allowed to rise above 30° C. during the first thirty minutes of the reaction, is being kept cool, if necessary, by external cooling means. At the end of about 30 minutes, the external cooling is discontinued and the temperature of the well-stirred solution gradually rises to about 65°–70° C. at which point it is again cooled to room temperature. After stirring for ten hours and allowing to stand without stirring for a further period of 36 hours, the reddish-blue precipitate which is formed is filtered off and is found to contain about 26.3 percent chlorine. Upon further chlorination it can be converted into an azine identical with the product obtained in Example 1. It can be used directly for dyeing, and, after treatment with alkaline hydrosulfite and conversion to the dihydro-form, it contains about 13.2 percent chlorine and corresponds in properties to a dichlor-indanthrene. The product is soluble in concentrated sulfuric acid giving a reddish-brown colored solution which upon dilution with water produces a greenish to bluish-green precipitate.

The nitrobenzene can be recovered by the following process which I include as a part of the present invention: 400 parts of the nitrobenzene filtrate are heated to about 120–130° C. and, while stirring, about 40 to 50 parts of zinc dust are slowly added. If the solution does not turn to a greenish-blue color within a short time, that is, about 5 to 15 minutes, 5 to 20 parts of water are cautiously added to the hot stirred solution. At the end of about one hour, most, if not all, of the solute is precipitated. After standing for about twenty-four hours, the precipitate is filtered off. The precipitate thus obtained is a coloring matter which can be used as a blue vat dyestuffs. The nitrobenzene thus obtained is sufficiently pure to be employed several times in the process before it is necessary to purify it in other ways, for example, by distillation in the presence or absence of steam.

In the above examples, instead of separating the precipitated chlorinated product by filtration from the nitrobenzene, the nitrobenzene can be recovered by subjecting the reaction-mass to distillation in a current of steam. The non-volatile and insoluble polychlorinated dyestuff which comprises the residue, and which remains behind, can be collected by filtration or by other suitable means, washed with hot water, and, if desired, subsequently transformed or converted to a dichlorindanthrene by treatment with a suitable reducing agent.

The proportions, conditions of operation, etc., in the above examples can be varied within comparatively wide limits. For example, for each part of indanthrene, from 5 to 50 parts of nitrobenzene can be employed. Within limits, an increase in the amount of nitrobenzene employed decreases the time necessary to effect the desired degree of chlorination. While chlorination can be effected at temperatures from about 0° to about 70° C., the preferred temperature is about 30°–40° C. Temperatures higher than above 70° C. should be avoided in order to prevent or minimize the evolution of hydrogen chloride from the reaction-mixture. The polychlorinated indanthrenes or dyestuffs, or their mixtures, produced by the present invention can be readily converted to a dichlorindanthrene by treating them with an alkaline hydrosulfite solution and subsequent oxidation with air, or with ferrous sulfate in sulfuric acid solutions at 125°–150° C., subsequently pouring the sulfuric acid solution into water, and collecting the precipitate by filtration or in any other suitable manner.

The dichlorindanthrenes thus produced can be purified in any well-known and suitable manner, for example, by treating them with an alkaline sodium hydrosulfite solution, filtering off the sodium salt of the leuco-dye thus produced, and subsequently blowing air through an aqueous suspension or solution of the sodium salt of the leuco-dye and collecting the precipitate by filtration.

The polychlorinated derivatives produced according to the present invention give dyeings from an alkaline hydrosulfite vat that are substantially similar or identical in properties to dyeings produced from an alkaline hydrosulfite vat of commercial dichlor-N-dihydro-1.2.2'.1'-anthraquinonazine dyestuffs of substantially the same purity and having a chlorine content of about 10 to 14 percent. I regard these polychlorinated derivatives of indanthrene as new compounds and as forming a part of the present invention.

It will thus be seen that the present invention permits the production of chlorine derivatives of indanthrene which contain more than 2, but not more than 6 atoms of chlorine; and that these derivatives upon reduction, for example, with ferrous sulfate in sulfuric acid solution, or with alkaline sodium hydrosulfite, lose chlorine and are converted in each case to a dichlor-derivative.

In the claims it will be understood that the term "polychlorine derivatives" refers to and includes derivatives having more than 2 and not more than 6 atoms of chlorine in their composition and whether in the azine, azhydrine or dihydroazine form.

I claim:

1. In the process of chlorinating indanthrene, the improvement which comprises treating indanthrene with chlorine in the presence of nitrobenzene at temperatures under about 70° C. until a polychlor-indanthrene derivative higher than a dichlorindanthrene derivative is produced.

2. The method of producing a dichlorindanthrene derivative, which comprises treating indanthrene with chlorine in the presence of nitrobenzene at a temperature under about 70° C. until a polychlor derivative of indanthrene higher than a dichlorine derivative is obtained and subsequently subjecting the product thus obtained to the action of a reducing agent, whereby a dichlorindanthrene derivative is produced.

3. As new products, the chlorinated indanthrene derivatives which contain more than 2 and not more than 6 atoms of chlorine and which upon treatment with an alkaline sodium hydrosulfite solution and subsequent oxidation with air yield a dichlorindanthrene.

4. As new products, the blue to yellow to yellowish-brown chlorinated indanthrene derivatives which contain from 15 to 32 per cent of chlorine, which are insoluble in water, and which by the action of reducing agents and subsequent oxidation with air yield a dichlorindanthrene.

5. The method of producing a dichlorindanthrene derivative, which comprises treating indanthrene with chlorine in the presence of nitrobenzene at a temperature not above 70° C. until a polychlorinated azine containing about 15 to 32 per cent of chlorine is produced, separating the precipitated polychlorinated azine thus produced from the nitrobenzene solution, and subjecting the azine to the action of an alkaline hydrosulfite solution, whereby a dichlorinated indanthrene is produced.

6. In the process of producing a chlorinated indanthrene, the step which comprises treating indanthrene with chlorine in the presence of nitrobenzene at a temperature of about 0° to 70° C. until a product containing about 15 to 32 percent of chlorine is obtained.

7. A composition of matter comprising a chlorinated indanthrene derivative which contains about 15 to 32 percent of chlorine and which upon treatment with an alkaline hydrosulfite solution is converted into a chlorinated indanthrene derivative which contains about 10 to 14 percent of chlorine.

8. In the production of a dichlorindanthrene derivative, the process which comprises treating indanthrene with chlorine in the presence of nitrobenzene at a temperature of about 15° to 60° C. until a product containing about 15 to 32 percent of chlorine is obtained, removing the product from the nitrobenzene and subjecting it to the action of a reducing agent, whereby a chlorinated indanthrene containing about 10 to 14 per cent of chlorine is produced.

9. The method of producing a chlorinated indanthrene containing about 10 to 14 per cent of chlorine, which comprises treating indanthrene in the presence of nitrobenzene with chlorine at a temperature ranging from ordinary temperature to about 50°–60° C. until a product containing from 15 to 32 per cent of chlorine is formed, separating the product from the nitrobenzene solution, subjecting the product thus obtained to the reducing action of an alkaline hydrosulfite solution, and subsequently oxidizing the reduced product by means of air.

10. The process of chlorinating indanthrene which comprises subjecting indanthrene to the action of chlorine in the presence of nitrobenzene at a temperature of about 15° C. to 60° C., whereby a chlorinated indanthrene derivative containing about 15 to 32 per cent of chlorine is produced.

11. In the process of chlorinating indanthrene, the improvement which comprises subjecting indanthrene to the action of chlorine in the presence of nitrobenzene at a temperature of about 30° to 40° C. until a chlorinated product containing about 15 to 32 per cent of chlorine is produced.

In testimony whereof I affix my signature.

JOYCE H. CROWELL.